INVENTOR.
AKSEL C. ELD

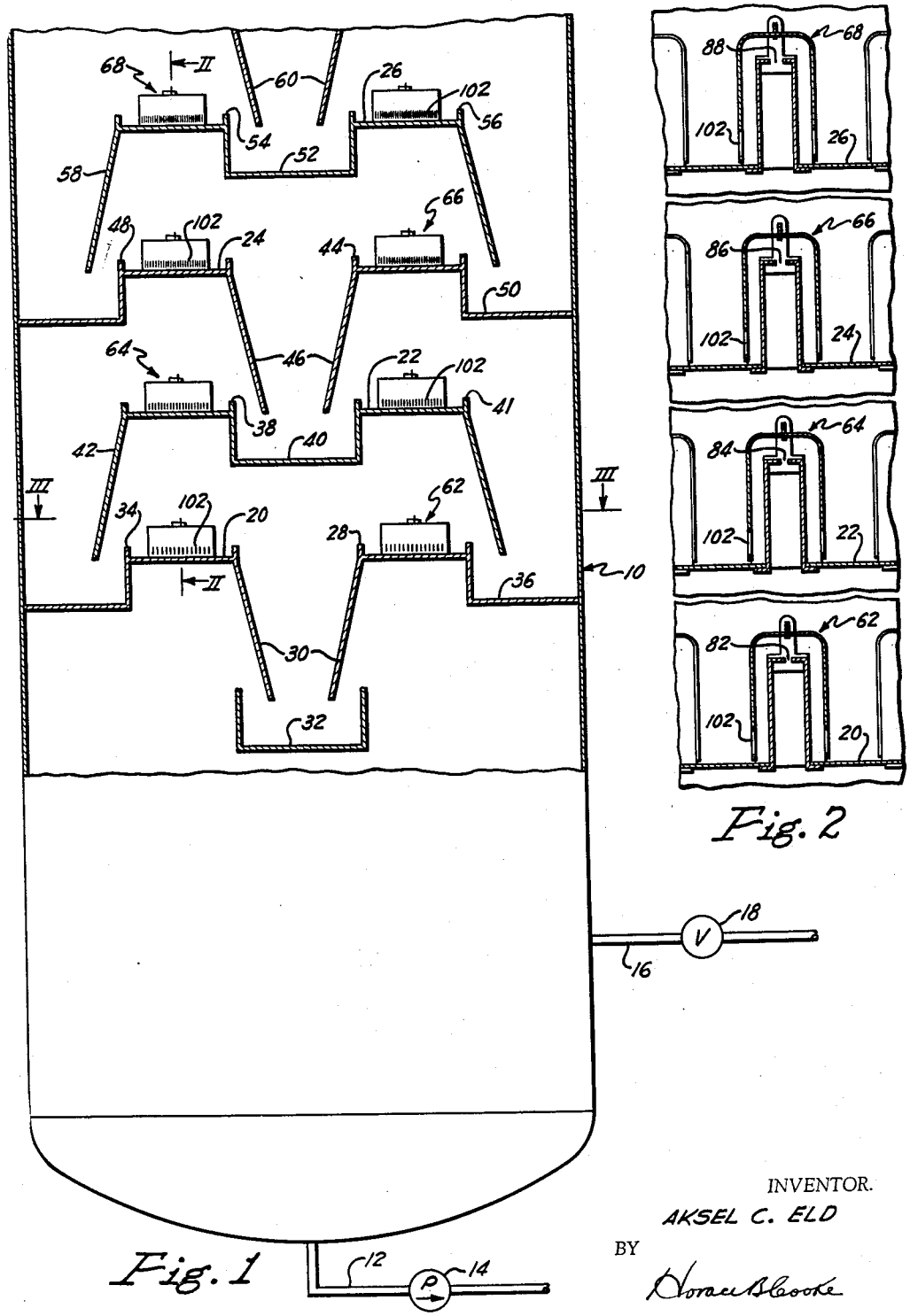

United States Patent Office 2,960,322
Patented Nov. 15, 1960

2,960,322

APPARATUS FOR COUNTERCURRENT CONTACTING OF LIQUID AND VAPOR STREAMS

Aksel C. Eld, Pittsburgh, Pa., assignor to Gulf Oil Corporation, Pittsburgh, Pa., a corporation of Pennsylvania Filed Apr. 3, 1957, Ser. No. 650,367

7 Claims. (Cl. 261—114)

The present invention relates to new and useful improvements in apparatus for the countercurrent contacting of vapor and liquid in stepwise vapor-liquid equilibrium stages, as is the practice in certain distillation and absorption processes, such as in fractionation, rectification, stripping, steam stripping, etc. More specifically, the invention is directed to maintaining a substantially uniform efficiency of vapor-liquid contact throughout all the various vapor-liquid equilibrium stages irrespective of substantial differences in the volume or mass rates of vapor flow entering the various vapor-liquid equilibrium stages.

It is well known that in the practice of the vapor-liquid contacting processes of the character mentioned above that, in general, there are differences in the volume or mass rates of vapor flow entering the various vapor-liquid equilibrium stages, and that such differences are sufficiently great in some instances, notably steam stripping, as to make it difficult to maintain uniformly efficient vapor-liquid contact in the various stages.

In general, the invention involves equally subdividing the vapor into an equal number of individual vapor streams upstream of each of the vapor-liquid equilibrium stages or contacting zones, while restricting the cross section of each of the individual vapor streams to a minimal value that is approximately proportional to the total mass rate of vapor flow entering the contacting zone, or which minimal value at least varies in the same sense that the total mass rate of vapor flow varies. In other words, the lower the total mass rate of vapor flow into a contacting zone, the lower will be the minimal cross section of the individual vapor streams introduced into such contacting zone. The invention also involves further subdividing each individual vapor stream immediately prior to the introduction of such individual vapor stream into a contacting zone, with the extent of such further subdivision being generally proportional to the mass rate of vapor flow of such individual vapor stream.

Broadly, the present invention has to do with apparatus for contacting vapor and liquid, wherein liquid is directed to travel sequentially through a pair of contacting zones with vapor directed to travel sequentially through such zones in reverse order, and wherein the mass rate of vapor flow into one of said zones exceeds the mass rate of flow into the other of said zones; with the improvement comprising subdividing the vapor into a plurality of individual vapor streams upstream of both of the zones and subdividing the vapor during its travel between the zones into a substantially equal number of individual vapor streams, introducing the individual vapor streams into the zone immediately downstream therefrom at spaced positions in such zone, maintaining the mass rate of vapor flow of each of the individual vapor streams that are introduced at spaced positions into said one of the contacting zones substantially equal to each other, and maintaining the mass rate of vapor flow of each of the individual vapor streams that are introduced into said other contacting zone substantially equal to each other by constricting the cross section of the last-mentioned individual vapor streams relative to the cross section of the penultimately named individual vapor streams.

With respect to a more limited aspect of the invention, the same has to do with apparatus for steam stripping a petroleum fraction, wherein liquid travels downwardly through a sequence of contacting zones with hydrocarbon and water vapor traveling upwardly through such zones; the improvement comprising subdividing the vapor into a substantially equal number of individual streams intermediate such pairs of contacting zones through which the vapor successively travels, and progressively increasing the minimal cross section of the individual vapor streams between each such pair of successive contacting zones.

The invention also involves a novel contacting device and the relation of such contacting device associated with different contacting zones to each other. Briefly, each contacting device defines a vapor passageway which includes a restricted orifice, with contacting devices of different contacting zones having different sized orifices. The contacting device is comprised of a chimney and a cap, said chimney comprising an upstanding hollow shell, said shell being inturned at its upper end to define a restricted exit orifice for the interior of the shell, said cap covering the shell in spaced relation thereto and extending downwardly to a position below the height of the orifice, said cap being provided with means disposed below the height of the orifice establishing communication between the interior and the exterior thereof, the arrangement being such that a passageway is defined by the interior of the shell, the exit orifice, the space between the cap and the shell, and said means, with the exit orifice constituting the minimal cross section of the passageway. Said means establishing communication between the interior and the exterior of the cap are preferably comprised of a plurality of openings or slots in the cap.

The invention will be best appreciated upon reference to the accompanying drawings which illustrate apparatus embodying the principles of the invention and which is suitable for practicing the invention. In the drawings:

Figure 1 is a side elevational view of the lower portion of a twin-flow steam stripper, with portions being broken away to illustrate details of internal construction in vertical section;

Figure 2 is an enlarged, broken, vertical sectional view taken upon the plane of the section line II—II in Figure 1, and illustrates the contacting devices in particular.

Figure 3:
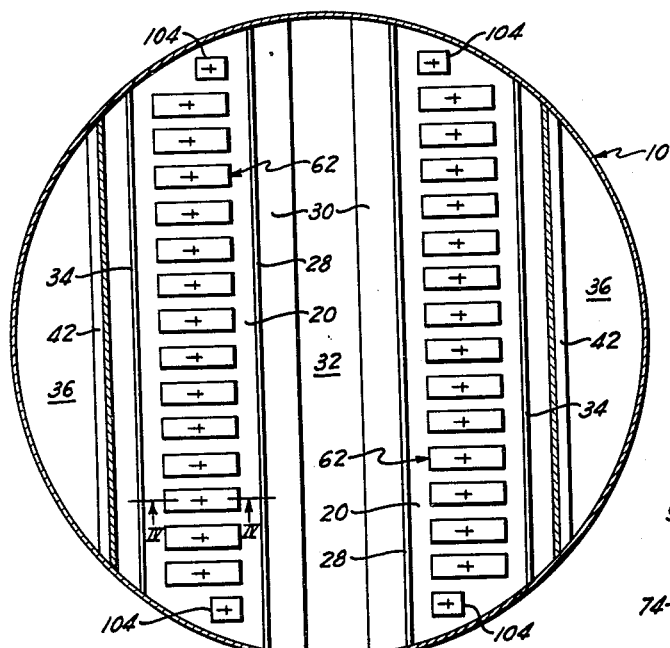
Figure 3 is a horizontal sectional view taken upon the plane of the section line III—III of Figure 1, and illustrates the arrangement of the contacting devices in particular.

Referring to the drawings and particularly Figure 1 which illustrates the lower portion of a steam stripper, the numeral 10 designates the steam stripper shell, the lower end of which is closed and provided with a liquid withdrawal pipe or conduit 12. The pipe 12 is provided with a pump 14 for removing liquid contents from the lower part of the shell 10 through the pipe 12. Steam is introduced into the shell 10 through a pipe or conduit 16 that is in turn provided with a valve 18 for controlling the rate at which steam is introduced into the shell 10.

With exceptions to be noted subsequently, the internal structure of the steam stripper shell 10 is in general a conventional twin-flow, vapor-liquid contacting arrangement, though it must be noted that the practice of the invention is not at all limited to a twin-flow construction, but as will be appreciated presently by those skilled in the art, can be used in conjunction with other conventional vapor-liquid contacting arrangements, such as the well-known conventional cross-flow arrangement.

The illustrated internal construction of the steam stripper shell 10 is comprised of a sequence of vertically spaced decks 20, 22, 24, and 26, each of which is constituted of two portions, as shown. The adjacent edges of the two portions of the deck 20 are provided with overflow or outlet weirs 28, as well as depending convergent downflow aprons constituting a center downflow 30. The center downflow 30 extends downwardly into the upper portion of a center sump 32 in spaced relation thereto. The remote edges of the two portions of the deck 20 are provided with inlet weirs 34 and end sumps 36, as shown.

The adjacent edges of the two portions of the deck 22 are provided with inlet weirs 38 and a center sump 40 therebetween, while the remote edges of the two portions of the deck 22 are provided with overflow or outlet weirs 41 and depending end downflow aprons 42 which extend downwardly into the end sumps 36 in spaced relation thereto to constitute end downflows for the deck 22.

The structure employed in connection with deck 24 is analogous to that described in connection with deck 20 and includes outlet weirs 44, a center downflow 46, inlet weirs 48, and end sumps 50. The structure employed in connection with deck 26 is analogous to that described in connection with deck 22 and includes a center sump 52, inlet weirs 54, outlet weirs 56 and downflow aprons 58.

It will be understood that additional deck constructions, not shown, are disposed above the illustrated deck constructions, the liquid downflow of which enters the center sump 52 through a center downflow 60 of the same character as the center downflows 30 and 46 previously described.

The structure thus far described is conventional in character, and it is believed will be fully appreciated without further elaboration by those skilled in the art.

Both portions of each of the decks 20, 22, 24, and 26 are provided with an arrangement of contacting devices. The contacting devices of the decks 20, 22, 24, and 26 being designated generally by the reference numerals 62, 64, 66, and 68, respectively.

Figure 5:
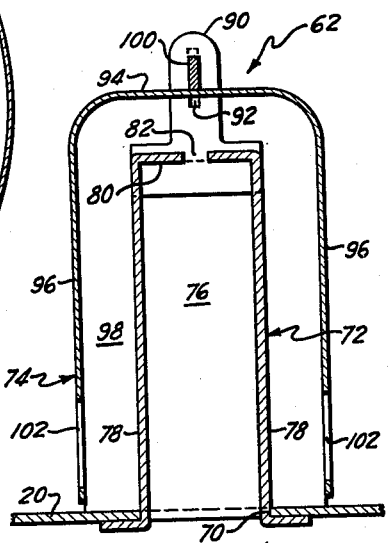
Figure 5 is a vertical sectional view of one of the contacting devices, and is taken upon the plane of the section line V—V of Figure 4.
Figure 4:
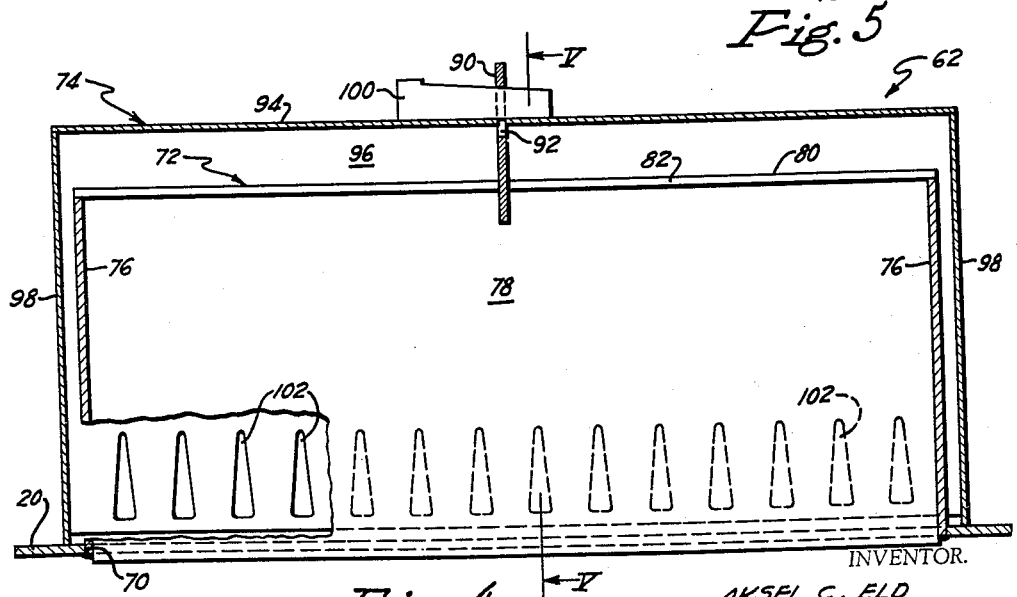
Figure 4 is an enlarged, vertical sectional view of one of the contacting devices, the view being taken upon the plane of the section line IV—IV of Figure 3.

In general the contacting devices are all very similar in construction, and a detailed description of one of the contacting devices 62 will suffice for all. In Figures 4 and 5, enlarged transverse and longitudinal vertical sectional views of one of the contacting devices 62 are shown, wherein it will be seen that a rectangular aperture 70 in the deck 20 is provided in association with each contacting device 62. The contacting device 62 is comprised of a chimney designated generally at 72 and a cap designated generally at 74. The chimney 72 is comprised of a hollow upstanding rectangular shell consisting of end walls 76 and side walls 78. The lower end portion of the shell is snugly received within the aperture 70 in the deck 20, with the lowest end portions of the side walls 78 being outturned as shown in Figure 5 and suitably secured by any suitable means, such as welding, not shown, to the underside of the deck 20. It will be understood that it is a desideratum that the connection between the chimney 72 and the deck 20 be vapor tight so that the only fluid communication through the aperture 70 is through the chimney 72. The upper end portions of the side walls 78 are inturned as at 80 at the upper extremity of the end walls 76 so as to define a restricted exit orifice 82 of rectangular configuration at the upper end of the chimney 72 for the interior thereof. It is important to interject at this point that the prime distinction between the contacting devices 62, 64, 66, and 68 is that the exit orifices thereof are of different widths, as will be readily seen upon reference to Figure 2 whereas in the exit orifices of the contacting devices 64, 66, and 68 are respectively designated at 84, 86, and 88. The importance of the existance of such distinction between the contacting devices of the various decks will be explained subsequently.

The chimney 72 is provided with a wedge key eye 90 which is fitted within complementary slots in the upper parts of the side walls 78 and the end portions 80 thereof. The wedge key eye 90 is suitably secured to the chimney 72 as by welding or the like, and the same includes an upstanding portion provided with a wedge receiving opening or eye 92.

The cap 74 is, like the chimney 72, of rectangular configuration and includes a top 94 and depending side and end walls 96 and 98 respectively. The cap 74 covers the chimney 72 in spaced relation thereto, as shown, with the wedge key eye 90 extending removably through a complementary aperture in the cover 94 of the cap 74. The end walls 98 of the cap 74 have their lower edges resting upon the deck 20, and are removably retained in such engagement by a wedge key 100 removably inserted in the eye 92 of the wedge key eye 90 in the manner best shown in Figure 4.

The lower extremities of the side walls 96 are spaced above the upper surface of the deck 20, as best shown in Figure 5. The lower portions of the side walls 96 of the cap 74 are provided with a plurality of generally isosceles triangle shaped slots or openings 102, as best shown in Figures 4 and 5. The second and final distinction between the contacting devices of the various decks is that while the slots 102 of the various contacting devices are of the same size, there are a greater number of slots 102 employed in conjunction with the contacting devices having larger exit orifices. Thus, as previously noted, the exit orifices of the contacting devices 62, 64, 66, and 68 are progressively larger, and accordingly it will be seen upon inspection of Figure 1 that such contacting devices are provided with progressively greater numbers of slots 102.

With respect to each of the contacting devices, it is to be noted that the height of the exit orifice is disposed at a position above the height of the outlet weir associated with the same deck as the contacting device. Thus, with respect to the contacting device 62, the exit orifice 82 is disposed substantially higher than the top of the outlet weirs 28. On the other hand, with respect to each of the contacting devices, the slots 102 are disposed entirely below the level of the top of the outlet weir associated with the deck of the contacting device. Thus, the slots 102 of the contacting device 62 are disposed entirely below the level of the top of the outlet weirs 28.

Referring to Figure 3, it will be noted that all of the contacting devices 62 are of equal size and uniformly spaced insofar as the cylindrical configuration of the steam stripper shell 10 permits. Because of the cylindrical character of the steam stripper shell 10, it is necessary to employ four contacting devices 104 in order to secure optimum coverage of both portions of the deck 20 by the contacting devices. It should be noted that the contacting devices 104 are in all dimensional respects exact duplicates of the contacting devices 62 except for having a lesser longitudinal length. Though not shown, the arrays of contacting devices 64, 66, and 68 are completed on their respective decks by longitudinally reduced contacting devices similar to the contacting devices 104. It is to be particularly emphasized that each of the decks is provided with equal numbers of contacting devices and that the sole essential distinctions between the contacting devices of any two decks is of the character previously specified, that is, exit orifices of different size, and the employment of differing numbers of equal-sized slots in the caps.

In the light of the preceding, the operation of the illustrated embodiment of the invention will be readily appreciated. Referring to Figure 1, it will be seen that in accordance with the operation of conventional twin-flow, vapor-liquid contacting apparatus, liquid courses downwardly through the interior of the steam stripper shell 10 along a path such that liquid moves downwardly through the center downflow 60 into the center sump 52 so as to fill the latter and cause a liquid seal against vapor entering the lower end of the center downflow 60. Liquid overflowing the inlet weirs 54 passes on to both portions of the deck 26 so that the liquid stands to at least the height of the outlet weirs 56. Liquid overflowing the outlet weirs 56 passes down the end downflow aprons 58 to fill the end sumps 50, causing a liquid seal against upward passage of vapor between the aprons 58 and the walls of the shell 10. Liquid overflowing the inlet weirs 48 covers the top of both portions of the deck 24 to a height at least as great as that of the outlet weirs 44, with liquid overflowing the outlet weirs 44 passing downwardly through the center downflow 46 into the sump 40 so as to fill the latter and cause a liquid seal against the passage of vapor upwardly into the center downflow 46. Liquid filling the center sump 40 and overflowing the inlet weirs 38 covers both portions of the deck 22 to a depth at least as great as the height of the outlet weirs 41, with liquid overflowing the outlet weirs 41 passing downwardly over the end downflow aprons 42 into the end sumps 36 so as to fill the latter and cause a liquid seal against vapor passing upwardly between the aprons 42 and the walls of the shell 10. Liquid overflowing the inlet weirs 34 covers the deck 20 to a depth at least as great as the height of the outlet weirs 28, with liquid overflowing the outlet weirs 28 passing downwardly through the center downflow 30 into the center sump 32 so as to fill the latter and make a liquid seal against the passage of vapor upwardly through the center downflow 30. Liquid overflowing the center sump 32 passes to the bottom of the shell 10 and is discharged therefrom through the pipe 12 through the action of the pump 14.

Normally, the pump 14 is operated so as to maintain a liquid level within the lower portion of the steam stripper shell 10 at a position below the height at which steam is introduced into the shell 10 through the pipe or conduit 16. Steam introduced into the lower portion of the shell 10 through the pipe 16 passes upwardly through the contacting devices 62 (as well as the contacting devices 104 of course) into intimate contact with liquid on both portions of the deck 20, with vapor (water vapor and stripped hydrocarbons) rising from the deck 20 thereafter passing upwardly through the contacting devices 64 and into intimate contact with liquids standing on both portions of the deck 22, with vapor rising from the deck 22 passing through the contacting devices 66 into intimate contact with liquid standing on both portions of the deck 24, with vapor rising from the deck 24 passing upwardly through the contacting devices 68 into intimate contact with liquid standing on both portions of the deck 26, and so forth with respect to whatever decks may be disposed thereabove.

It is well known in the art that during such operation of a steam stripper that the volume and/or mass rate of flow of vapor progressively increases as the vapor passes successively from one contacting zone to the next, it being understood that the expression "contacting zone" as used throughout this specification and in the appended claims has reference to the space immediately overlying a deck and surrounding the contacting devices thereon. Recognition by those skilled in the art as to the difference in the volume and/or mass rate of vapor flow along its travel path is evidenced by the fact that while identical contacting devices are used in conjunction with the lower decks, progressively greater numbers of contacting devices are used on the decks through which the vapor progressively travels. Such variation in the number of contacting devices used in conjunction with the various decks has heretofore been believed necessary in order to prevent with respect to contacting devices on the lower decks either or both vapor starvation of some of the contacting devices or what is known as liquid dumping by some of the other contacting devices. By way of clarification, it may be mentioned that liquid dumping has reference to liquid on a deck passing downwardly through a contacting device on such deck, rather than vapor passing upwardly through the contacting device, as intended.

In other words, according to prior art practices, proper operation of the contacting devices on lower decks has been obtained at the sacrifice of the number of contacting devices that could be employed.

That no such sacrifice in the number of contacting devices employed on the lower decks is necessary with the disclosed embodiment of the invention is due to the fact that the contacting devices of the successively lower decks have progressively smaller exit orifices. It will again be noted that with respect to each of the contacting devices, the exit orifice constitutes the minimal cross section of the passageway defined through the contacting device and also constitutes the greatest resistance to vapor flow through the contacting device. Consequently, the resistance to vapor flow through the contacting devices 62, 64, 66, and 68 progressively decreases. As the volume and/or mass rate of vapor flow progressively increases through such devices, such differences in resistances tend to maintain substantially equal pressure drops through the various devices so as to avoid flooding upper decks and still obtain near ideal vapor distribution on each deck.

Since a substantially smaller rate of vapor volume and/or mass flows through the lower decks, and particularly through deck 20, minor differences in liquid depth adjacent different contacting devices on the same deck would result in substantially different vapor flow rates through the various contacting devices were it not for the greater constriction (smaller exit orifice) given the individual vapor streams passing through the contacting devices. Such constriction of the individual vapor streams results in the proportion of the total resistance to vapor flow through a contacting device constituted of a differential in depth of liquid on a deck being small relative to the proportion of the resistance afforded by the constriction caused by the exit orifice. In other words, the effects of liquid depth differentials which tend to cause substantially different vapor flow rates through the various contacting devices are substantially minimized, so that an equal number of contacting devices can be employed on each deck and so that superior vapor-liquid contact can be obtained on the decks through which the least vapor passes.

The slots or openings 102 in the caps of the contacting devices are for the purpose of subdividing the individual vapor streams passing through the exit orifices and causing the vapor to enter the liquid as small bubbles for obtaining a large overall vapor-liquid interface area. The slots 102 of any particular contacting device offer substantially minor resistance to vapor flow as compared to the resistance afforded by the exit orifice of such contacting device. Progressively larger numbers of slots 102 are employed with the contacting devices 62, 64, 66, and 68 for the reason that progressively larger volumes of vapor pass through such devices so as to support the formation of larger numbers of bubbles.

A steam stripper of the type disclosed of 10 foot diameter and capable of handling approximately 35,000 barrels per day of reduced crude and approximately 14,000 pounds of steam per hour has been placed in use in a major refinery with gratifying results. In such utilization, the widths of exit orifices 82, 84, 86, and 88 are respectively 0.375, 0.50, 0.625, and 0.75 inch. The area of an individual slot 102 is 0.337 square inch with the individual contacting devices 62, 64, 66 and 68 having respectively 28, 40, 50, and 58 slots. The clearance between the cap and the top and sides of the chimney of each contacting device is about 0.875 inch. The exit orifices of the devices 62, 64, 66, and 68 are 13.5 inches long. With respect to each deck, the heights of the outlet weirs, the slots 102, the chimneys and the caps are respectively 2.125, 1.56, 5.500, and 6.44 inches.

With respect to the degree of variation in the size of the exit orifices, it can be said that as a practical matter where the space between decks is uniform and as short as possible, the exit orifices should be of such size that although equal numbers of the same are employed in conjunction with each deck and despite differing volume and/or mass rates of vapor flow, the pressure drop from deck to deck should be substantially equal. As a practical matter, some departure from obtaining equal pressure drops from deck to deck by suitable exit orifice design may be necessitiated to obviate any potential hazard of flooding through the use of excessively minute exit orifices which may become fouled or plugged by dirt or the like.

While the expression "volume and/or mass rate of vapor flow" has been used in the foregoing, a more precise expression of the physical quantity concerned is the product of the square of volume rate of flow multiplied by the density of the vapor. Such physical quantity is more directly related to pressure drop than either volume rate of vapor flow or mass rate of vapor flow, as will be understood by those skilled in the art.

As mentioned previously, the practice of the invention is applicable to types of contacting apparatus other than the twin flow such as for example the conventional cross flow apparatus. Also, the invention can be practiced in connection with any vapor-liquid contacting process of a distillation or absorption chearacter where a sequence of contacting zones are employed with countercurrent vapor and liquid flows, where the volume and/or mass rate of vapor flow varies from zone to zone. In such circumstances, the practice of the invention is especially indicated and yields particularly advantageous results where the liquid flow rate is great relative to the vapor flow rate, as techniques heretofore employed have encountered great difficulty in efficiently contacting all the liquid passing through a contacting zone with vapor, especially in the zones with the least vapor flow. It will be appreciated that practice of the invention obtains efficient vapor-liquid contact in all zones despite both variations in vapor flow and small vapor flow relative to liquid flow.

In the light of the preceding, it will be evident that forms of contacting devices other than the illustrated preferred rectangular form can be utilized, such as those of circular configuration, it being only essential that the same be provided with a restricted exit orifice for the chimney thereof with the same constituting the most restricted portion of the vapor passageway therethrough, and that the deck or decks having the least volume and/or mass rate of vapor flow therethrough have the contacting devices thereon provided with the smallest exit orifices, In the preferred form of contacting device, though not essential, the exit orifice is postioned at a height such as to be above the surface of the liquid on the deck, so that dumping cannot occcur.

Ordinarily, in distillation processes such as the steam stripping described, the volume or mass rate of vapor flow increases progressively upwardly through the decks of the apparatus, and consequently the exit orifices of contacting devices on higher decks are made progressively larger. It will of course be understood that the expression "progressively larger" does not necessarily require that the contacting devices of two successive decks have differing sized orifices, particularly where the vapor flow rate does not change much through one deck to the next, but that the size of the exit orifices of the contacting devices of an upper deck will be larger. It will be understood, of course, that increasing the size of the exit orifices of the contacting devices of such upper deck desirably lessens the pressure differential between the spaces above and below such deck.

Where in a vapor-liquid contacting process such as an absorption process, the volume and/or mass rate of vapor flow decreases rather than increases along its course of travel, a reverse order of exit orifice size variation is made. In such a process, the exit orifices of the contacting devices through which the vapor successively travels are made progressively smaller, with the number of slots being commensurately decreased.

From the foregoing, the principles of the invention will be fully understood. It will be appreciated that the same has been presented in substantial detail for purpose of clarity, and that therefore no restricted scope of invention is to be implied thereby. Reference must be made to the appended claims in order to ascertain the actual scope of the invention.

I claim:

1. In apparatus for the countercurrent contacting of vapor and liquid, an apertured deck provided with an outlet weir to maintain a depth of liquid thereon, a contact device associated with each aperture of the deck, each contact device comprising a chimney and a cap, said chimney comprising an upstanding hollow shell secured at its lower end to the deck in communication with its associated aperture, said shell having opposed inturned edges at its upper end defining an exit orifice intermediate such opposed inturned edges at the upper end of the chimney for the interior thereof that is of substantially reduced horizontal cross sectional area, said orifice being disposed substantially above the height of the top of the weir so that the orifice will be above the surface of the liquid retained on the deck by the weir, said cap covering the chimney in spaced relation thereto and extending downwardly to a position below the height of the top of the weir, and means below the height of the top of the weir for establishing communication between the interior and exterior of the cap, the arrangement being such that a passageway for vapor is established with respect to each aperture and its associated contact device comprising the aperture, the interior of the chimney, the exit orifice of the chimney, the space between the chimney and the cap and said means, said passageway having its least cross section and greatest resistance to vapor flow at said exit orifice.

2. In apparatus for the countercurrent contacting of vapor and liquid, an apertured deck provided with an outlet weir to maintain a depth of liquid thereon, a contact device associated with each aperture comprising a chimney and a cap, said chimney comprising an upstanding hollow shell secured at its lower end to the deck in communication with its associated aperture, said shell being of substantially rectangular horizontal configuration with the major sides thereof being inturned toward each other at the top of the chimney defining intermediate adjacent edges of the inturned sides an elongated exit orifice at the upper end of the chimney for the interior thereof, said orifice being disposed substantially above the height of the top of the weir so that it is above the surface of liquid retained on the deck by the weir, said cap being also of rectangular horizontal configuration and covering the chimney in spaced relation thereto and extending downwardly to a position below the height of the top of the weir, said cap being provided with means adjacent its lower extremity for establishing communication between the interior and the exterior of the cap, the arrangement being such that a passageway for vapor is established with respect to each aperture comprising the aperture, the interior of the chimney, the exit orifice of the chimney, the space between the chimney and the cap and said means, said passageway having its least cross section and greatest resistance to vapor flow at said exit orifice.

3. In apparatus for the countercurrent contacting of vapor and liquid, a sequence of vertically spaced decks each provided with an outlet weir to maintain a depth of liquid thereon, each deck having a substantially equal number of apertures therethrough, a contact device associated with each of the apertures comprising a chimney and a cap, said chimney comprising an upstanding hollow shell secured at its lower end to the deck in communication with the aperture associated therewith, said shell having opposed inturned edges at its upper end defining intermediate such opposed inturned edges a restricted exit orifice for the interior of the shell, said cap covering the shell in spaced relation thereto and extending downwardly to a position below the height of the top of the outlet weir associated with the deck in which the aperture is situated, and said cap being provided with means adjacent its lower extremity establishing communication between the interior and the exterior thereof, the arrangement being such that a passageway is defined comprising the aperture, the interior of the shell, the exit orifice, the space between the shell and the cap and said means, with the least cross section of such passageway being at the exit orifice, the contact devices of the vertical sequence of decks having progressively smaller exit orifices.

4. The combination of claim 3, wherein the communication establishing means associated with each cap comprises a plurality of openings in the cap, the number of openings in the cap of each contacting device being approximately proportional to the cross section of the exit orifice.

5. The combination of claim 3, wherein each exit orifice is disposed substantially above the height of the top of the weir with which the same is associated, so that the exit orifice is above the surface of liquid retained by the weir.

6. A contacting device comprising a chimney and a cap, said chimney comprising an upstanding hollow shell of rectangular horizontal configuration, the lower edge of said shell being adapted to be secured to a deck in communication with an aperture therethrough, the major sides of said shell having opposed inturned edges at the upper end of the shell defining intermediate such inturned edges a restricted exit orifice for the interior of the shell, said cap being also of rectangular horizontal configuration, means for detachably securing the cap to the chimney with the cap covering the chimney in spaced relation thereto with the cap extending to a position below the height of the exit orifice, and said cap being provided with means below the level of the exit orifice for establishing communication between the interior and the exterior thereof, the arrangement being such that a passageway is defined through the device by the interior of the chimney, the exit orifice, the space between the chimney and the cap and the last said means, with the passageway having its least cross section at the exit orifice.

7. The combination of claim 6, wherein the exit orifice is of rectangular configuration, and wherein said last means comprises a plurality of openings through the major sides of the cap.

References Cited in the file of this patent

UNITED STATES PATENTS

| | | |
|---|---|---|
| 2,084,768 | Garrison | June 22, 1937 |
| 2,222,565 | Kraft | Nov. 19, 1940 |
| 2,428,889 | Nutter | Oct. 14, 1947 |
| 2,438,536 | Cairns | Mar. 30, 1948 |
| 2,564,078 | Pyle | Aug. 14, 1951 |
| 2,602,652 | Haynes | July 8, 1952 |
| 2,658,737 | Nutter | Nov. 10, 1953 |
| 2,658,738 | Plossl et al. | Nov. 10, 1953 |
| 2,710,177 | Young | June 7, 1955 |

FOREIGN PATENTS

| | | |
|---|---|---|
| 751,215 | Great Britain | June 27, 1956 |